US009851973B2

(12) United States Patent
Forsyth et al.

(10) Patent No.: US 9,851,973 B2
(45) Date of Patent: Dec. 26, 2017

(54) DYNAMIC BRANCH HINTS USING BRANCHES-TO-NOWHERE CONDITIONAL BRANCH

(75) Inventors: Andrew T. Forsyth, Kirkland, WA (US); Renju Thomas, Austin, TX (US); Jean-Luc Duprat, Victoria (CA)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 13/997,828

(22) PCT Filed: Mar. 30, 2012

(86) PCT No.: PCT/US2012/031635
§ 371 (c)(1),
(2), (4) Date: Jun. 25, 2013

(87) PCT Pub. No.: WO2013/147879
PCT Pub. Date: Oct. 3, 2013

(65) Prior Publication Data
US 2014/0229721 A1     Aug. 14, 2014

(51) Int. Cl.
*G06F 9/38*     (2006.01)
*G06F 9/30*     (2006.01)
(52) U.S. Cl.
CPC .......... *G06F 9/3806* (2013.01); *G06F 9/3005* (2013.01); *G06F 9/3844* (2013.01); *G06F 9/3846* (2013.01)
(58) Field of Classification Search
CPC ... G06F 9/3806; G06F 9/3844; G06F 9/30058
See application file for complete search history.

(56) References Cited

U.S. PATENT DOCUMENTS

| | | | | |
|---|---|---|---|---|
| 5,507,028 A | * | 4/1996 | Liu ....................... | G06F 9/3844 712/207 |
| 5,918,046 A | * | 6/1999 | Hoyt ..................... | G06F 9/3806 712/239 |

(Continued)

OTHER PUBLICATIONS

PCT Notification concerning Transmittal of International Preliminary Report on Patentability (Chapter I of the Patent Cooperation Treaty) for PCT Counterpart Application No. PCT/US2012/031635, 6 pgs., (Oct. 9, 2014).

(Continued)

*Primary Examiner* — Eric Coleman
(74) *Attorney, Agent, or Firm* — Nicholson De Vos Webster & Elliott LLP (57) ABSTRACT

A processor includes an execution pipeline having one or more execution units to execute instructions and a branch prediction unit coupled to the execution units. The branch prediction unit includes a branch history table to store prior branch predictions, a branch predictor, in response to a conditional branch instruction, to predict a branch target address of the conditional branch instruction based on the branch history table, and address match logic to compare the predicted branch target address with an address of a next instruction executed immediately following the conditional branch instruction. The address match logic is to cause the execution pipeline to be flushed if the predicted branch target address does not match the address of the next instruction to be executed.

20 Claims, 8 Drawing Sheets

(56) References Cited

U.S. PATENT DOCUMENTS

| | | | | |
|---|---|---|---|---|
| 6,622,240 B1* | 9/2003 | Olson | ................ | G06F 9/30058 712/233 |
| 6,823,447 B2* | 11/2004 | Hay | ..................... | G06F 9/3806 712/237 |
| 6,971,000 B1* | 11/2005 | Sinharoy | ................ | G06F 8/445 712/234 |
| 7,082,520 B2 | 7/2006 | Bonanno et al. | | |
| 7,493,480 B2 | 2/2009 | Emma et al. | | |
| 7,673,122 B1* | 3/2010 | Song | ..................... | G06F 9/3846 712/239 |
| 2001/0032309 A1* | 10/2001 | Henry | .................. | G06F 9/3848 712/239 |
| 2005/0144427 A1 | 6/2005 | Col et al. | | |
| 2005/0278513 A1* | 12/2005 | Aristodemou | ............ | G06F 5/01 712/228 |
| 2006/0026408 A1* | 2/2006 | Morris | ................. | G06F 9/3848 712/239 |
| 2007/0294518 A1* | 12/2007 | Wang | ..................... | G06F 9/322 712/238 |
| 2009/0089564 A1* | 4/2009 | Brickell | ............. | G06F 9/30003 712/239 |
| 2011/0225401 A1 | 9/2011 | Emma et al. | | |
| 2011/0320787 A1* | 12/2011 | Dieffenderfer | ...... | G06F 9/30003 712/234 |

OTHER PUBLICATIONS

International Search Report dated Nov. 28, 2012, for International Application No. PCT/US2012/031635, 8 pages.
McFarling, Scott, "Combining Branch Predictors," Western Research Laboratory, Palo Alto, CA, USA, WRL Technical Note TN-36, Jun. 1993.

* cited by examiner

DYNAMIC BRANCH HINTS USING BRANCHES-TO-NOWHERE CONDITIONAL BRANCH

CROSS-REFERENCE TO RELATED APPLICATION

This patent application is a U.S. National Phase Application under 35 U.S.C. §371 of International Application No. PCT/US2012/031635, filed Mar. 30, 2012, entitled DYNAMIC BRANCH HINTS USING BRANCHES-TO-NOWHERE CONDITIONAL BRANCH.

TECHNICAL FIELD

Embodiments of the present invention relate generally to branch predictions of a processor. More particularly, embodiments of the invention relate to dynamic branch hints using a branch-to-nowhere conditional branch.

BACKGROUND ART

Modern microprocessor pipelines use branch prediction to mitigate performance loss due to control dependency stalls. Many solutions where the branch predictor learns entirely in hardware or in a combination with software have been proposed and used in several generations of microprocessors. All of these schemes attempt to predict a branch outcome based on a history context that is derived from prior computation state that contains correlated information to the branch outcome. Global history based branch predictors such as gshare and bgG use a context derived from global branch history which has been proven to contain correlated information for correctly predicting branches in many cases. However, in certain cases such as when the branch outcome depends on input data with no predictable patterns, the global history may not have any correlated information, and such branches are hard to predict using predictors such as gshare.

However, a compiler might know the outcome of such hard-to-predict data-dependent branches and be able to convey that information to the hardware. One of the most attractive solutions are branch hint instructions that can be placed ahead of a branch in the code stream and provide a hint about which way the branch is going. These may be static hints or they may be dynamic, with static hints being simple, but outperformed by a modern branch prediction. Dynamic branch hints are more complex to implement, and while they have been proposed many times, there is resistance to them for many reasons, such as the significant additional complexity to the microarchitecture is an example.

Figure 1A:
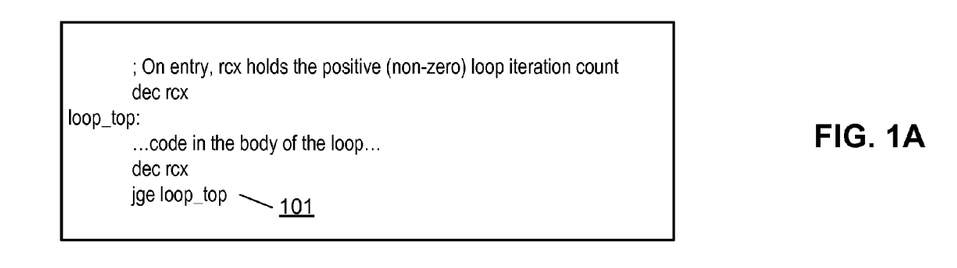
FIGS. 1A-1C are pseudocode representing a typical program loop with a conditional branch.
Figure 1B:
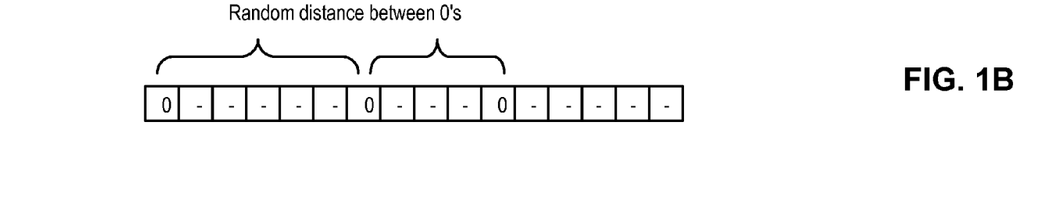

FIG. 1A is pseudocode representing a typical program loop with a conditional branch. In this example the loop is executed an unpredictable number of times, which means that existing branch predictors such as gshare or loop prediction do not work perfectly. Typically they will mispredict the non-taken branch (e.g., instruction 101) at the end of the loop and will speculate that the loop will continue to run. FIG. 1B illustrates a global branch history recorded for code as shown in FIG. 1A, when predicting loop exit while running the loop over and over with random loop counts. Note that the distance between 0's in the global history (prior loop exits) will be a random distribution when the loop count is random. Therefore, the global history does not contain information that helps in correctly predicting loop exit.

Mispredicting the loop leads to wasted fetch, decode and execution of many wrong path instructions, which must then be thrown away when the branch is resolved. Mispredictions and subsequent wrong path execution reduce performance by consuming cycles that could have been used to execute correct instructions; the machine is also wasting joules performing speculative computations that then get thrown away. The performance and energy cost of mispredictions is exacerbated in a longer pipeline.

Figure 1C:
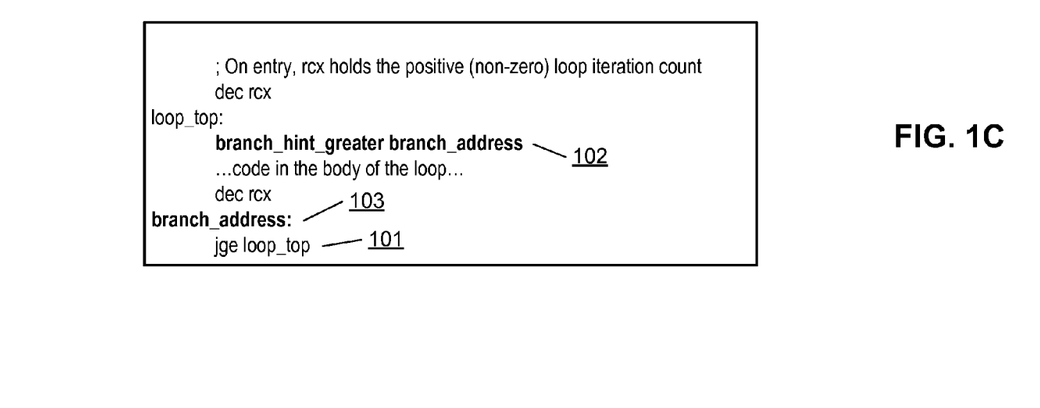

In an attempt to reduce mispredictions, a standard dynamic branch hint instruction would be deployed, in which new instruction 102 and label 103 are added as shown in FIG. 1C. The mythical instruction 102 checks the flags with a "greater than" test. If the test passes, it tells the branch predictor that the instruction at the address given by its argument 103 will branch the same way. This instruction has no architectural affect as it does not change program state; it simply updates or hints the branch prediction hardware. Note the trick of using a "greater than" test at the top of the loop but a "greater or equal" at the bottom, and also of reusing the flags set by instruction DEC at the bottom of the loop to feed the hint at the top. Alternatively instruction DEC could be moved to the top of the loop and both tests changed to use a "greater or equal" test, but frequently the body of the loop will want to use the loop counter as an input.

Ideally, the branch hint instruction needs to be put a number of clocks ahead of the branch itself in the pipeline, so that it is executed and its condition resolved well before the hard-to-predict branch for which the hint is targeted has entered the start of the pipeline. Thus the optimal distance does depend on the details of the microarchitecture and the pipeline length. The obvious problem with adding branch hint instructions is that they are a new set of instructions, and thus have compatibility concerns both forwards and backwards. Furthermore, after instruction 102 of FIG. 1C is computed, this value has to be communicated to the predictor before predicting the hard-predict-branch for which the hint is targeted. This means that somehow there has to be a dynamic matching and communication of computed value from the branch hint instruction to the dynamic branch for which the hint is targeted prior to its prediction time. Potential implementations of this communication mechanism in microarchitecture are very complex and may not be reliable.

BRIEF DESCRIPTION OF THE DRAWINGS

Embodiments of the invention are illustrated by way of example and not limitation in the figures of the accompanying drawings in which like references indicate similar elements.

DESCRIPTION OF THE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is presented to boost predictability of hard-to-predict branches by injecting correlated information into the global history of dynamic predictors such as gshare using existing conditional branch instructions effectively as dynamic branch hints by means of specific modifications to the microarchitecture. An embodiment of the invention is to replace the mythical branch_hint instruction with a standard conditional branch, but one that goes to the next instruction in the code stream, whether the branch is taken or not (also referred to as a branch-to-nowhere conditional branch). The rationale is that by inserting such a branch in code prior to the branch-under-prediction (subject to certain minimum distance requirements between the two), it injects correlated information into the global history that will help the subsequent branch to predict correctly.

Furthermore, according to a further embodiment, certain microarchitecture features are implemented that significantly reduce pipeline penalty for all mispredictions of the branch-to-nowhere. It is a combination of using the branch-to-nowhere to correctly predict the branch-under-prediction (e.g., a following branch prediction), but incurring zero or significantly less pipeline penalty for its own mispredictions that is the key to gaining a net performance benefit. In one embodiment, instead of flushing the pipeline based on a branch misprediction, the pipeline may be flushed based on a comparison of instruction pointers (IPs) of predicted target branch address of a conditional branch and an address of an instruction immediately following the conditional branch, while the global history information is updated based on whether the predicted target branch address has been taken. Because the instruction following the branch-to-nowhere is the same whether or not the branch is taken, this IP comparison always succeeds, and thus no flush is ever generated by the branch-to-nowhere.

Figure 2:
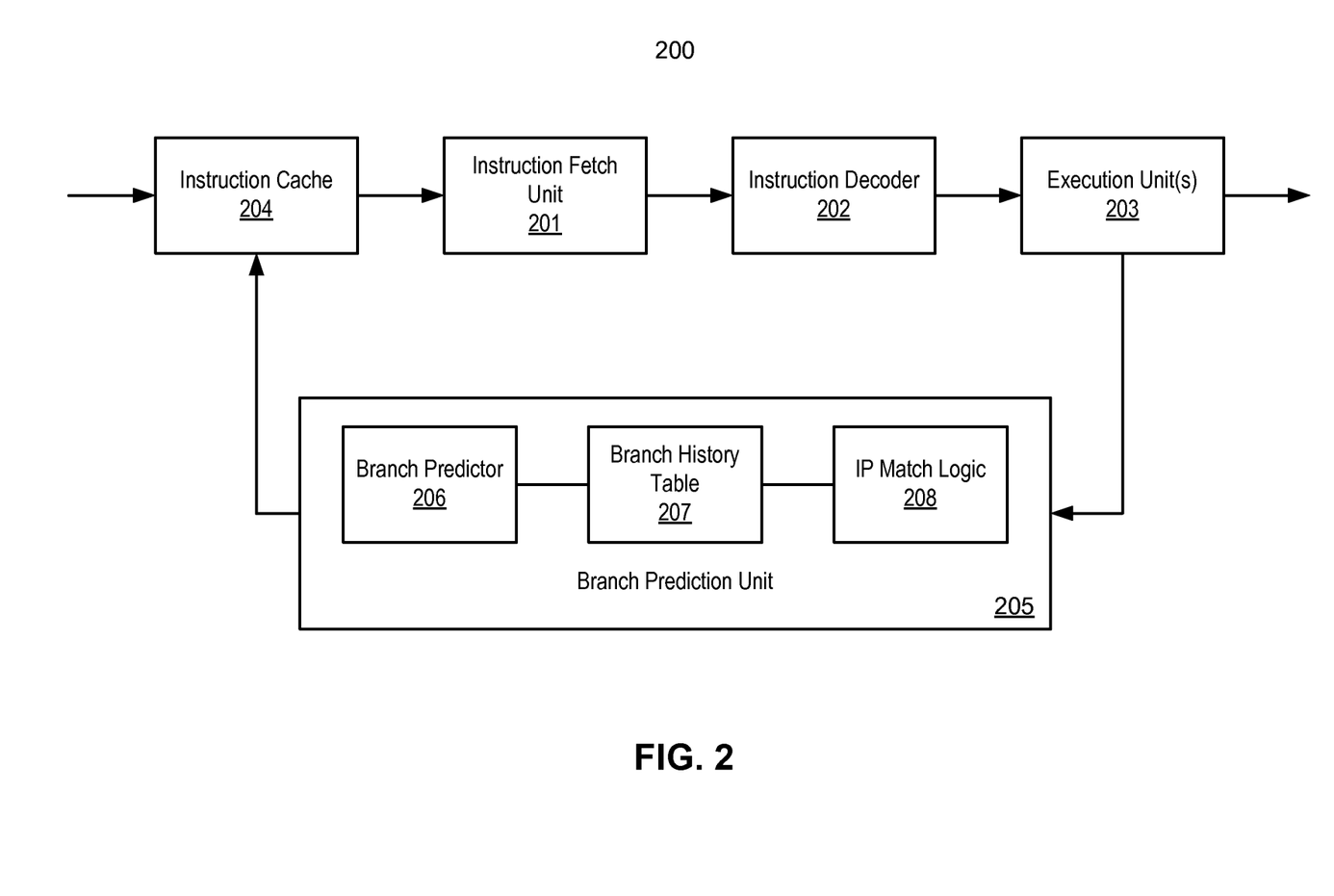
FIG. 2 is a block diagram of an execution pipeline of a processor or processor core according to one embodiment of the invention.

FIG. 2 is a block diagram of an execution pipeline of a processor or processor core according to one embodiment of the invention. Referring to FIG. 2, processor 200 may represent any kind of instruction processing apparatuses. For example, processor 200 may be a general-purpose processor. Processor 200 may be any of various complex instruction set computing (CISC) processors, various reduced instruction set computing (RISC) processors, various very long instruction word (VLIW) processors, various hybrids thereof, or other types of processors entirely. Processor 200 may also represent one or more processor cores.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In one embodiment, processor 200 includes, but is not limited to, instruction fetch unit 201, instruction decoder 202, one or more execution units 203, instruction cache 204, and branch prediction unit 205. Instruction fetch unit 201 is configured to fetch or prefetch instructions from instruction cache 204 or from system memory (not shown). Instruction decoder 202 is to receive and decode instructions from instruction fetch unit 201. Instruction decoder 202 may generate and output one or more micro-operations, micro-code, entry points, microinstructions, other instructions, or other control signals, which reflect, or are derived from, the instructions. Instruction decoder 202 may be implemented using various different mechanisms. Examples of suitable mechanisms include, but are not limited to, microcode read only memories (ROMs), look-up tables, hardware implementations, programmable logic arrays (PLAs), and the like.

Execution units 203, which may include an arithmetic logic unit, or another type of logic unit capable of performing operations based on instructions. As a result of instruction decoder 202 decoding the instructions, execution unit 203 may receive one or more micro-operations, micro-code entry points, microinstructions, other instructions, or other control signals, which reflect, or are derived from, the instructions. Execution unit 203 may be operable as a result of instructions indicating one or more source operands (SRC) and to store a result in one or more destination operands (DEST) of a register set indicated by the instructions. Execution unit 203 may include circuitry or other execution logic (e.g., software combined with hardware and/or firmware) operable to execute instructions or other control signals derived from the instructions and perform an operation accordingly. Execution unit 203 may represent any kinds of execution units such as logic units, arithmetic logic units (ALUs), arithmetic units, integer units, etc.

Some or all of the source and destination operands may be stored in registers of a register set or memory. The register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Referring back to FIG. 2, according to one embodiment, branch prediction unit 205 includes branch predictor 206, branch history table 207, and IP match logic 208. Branch predictor 206 may be a circuit that tries to guess which way a branch will go before it is known for sure. The purpose of branch predictor 206 is to improve the flow in the instruction pipeline. In one embodiment, branch predictor 206 is to predict a branch target address of a conditional branch based on branch history information of previous branch predictions taken or not taken, which may be maintained in branch history table 207. Branch predictor 206 may be implemented similar to a variety of branch predictors such as bgG and/or gshare branch predictors.

According to some embodiments, a mechanism is utilized to boost predictability of hard-to-predict branches by injecting correlated information into the global history of dynamic predictors such as gshare using existing conditional branch instructions effectively as dynamic branch hints by means of specific modifications to the microarchitecture. An embodiment of the invention is to replace the mythical branch_hint instruction with a standard conditional branch, but one that goes to the next instruction in the code stream, whether the branch is taken or not (also referred to as a branch-to-nowhere conditional branch). The rationale is that by inserting such a branch in code prior to the branch-under-prediction (subject to certain minimum distance requirements between the two), it injects correlated information into the global history that will help the subsequent branch to predict correctly. Such a branch-to-nowhere conditional branch may be injected or inserted by a compiler or a software developer when source code is developed and compiled into execution code to be executed by processor 200.

According to one embodiment, branch predictor 206 is to predict a target branch address of a conditional branch (e.g., a branch-to-nowhere) based on prior branch predictions obtained from branch history 207. Based on the branch prediction, instead of flushing the pipeline based on a branch misprediction, branch predictor 206 is to flush the pipeline based on a comparison of instruction pointers (IPs) of predicted target branch address of a conditional branch and an address of an instruction that is executed immediately following the conditional branch, referred to herein as a next-executed instruction. A next-executed instruction refers to a dynamic instruction following the conditional branch in the program being executed by the processor. In one embodiment, IP match logic 208 is invoked to match an IP value of the predicted target branch address and an IP value of an instruction immediately following the conditional branch instruction just predicted by branch predictor 206. If the predicted IP value matches the IP value of the next-executed instruction, it means that the branch prediction is correct. However, if the predicted IP value does not match the IP value of the next-executed instruction, according to one embodiment, it is considered as a branch misprediction. That is, the predictor provides a predicted IP. For a conditional branch, that prediction can either be the destination of the branch, or it can be the instruction following the branch in memory order. But then later when the branch is executed and fully resolved, that resolution will also give an IP—either the target of the address or the instruction after the branch in memory order. This time it is not a prediction; rather, it is the actual result, i.e., where the processor needs to have gone for the code to function correctly. The two results (i.e., the predicted IP, and the resolved IP) then need to be compared. Either or both might be the following instruction in memory order. If they differ, the pipeline is flushed. When there is a misprediction, the pipeline is flushed. After the conditional branch is executed, the global history information is updated based on whether the predicted target branch address has been taken to be utilized for future branch predictions.

Figure 3A:
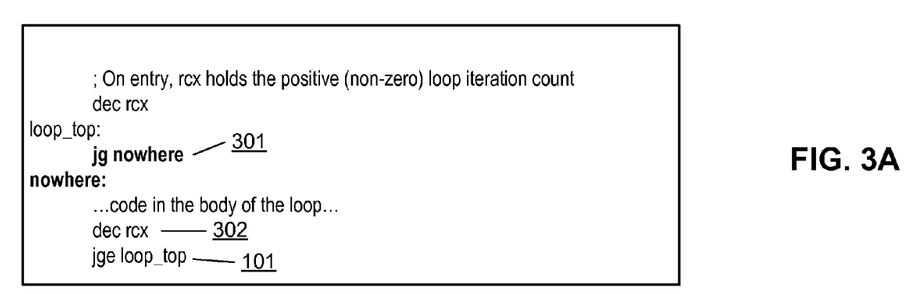
FIGS. 3A and 3B are pseudocode representing a typical program loop with a branch-to-nowhere conditional branch according to certain embodiments.

FIG. 3A is pseudocode representing a typical program loop with a branch-to-nowhere conditional branch according to one embodiment. Referring to FIG. 3A, the inserted branch instruction 301 is architecturally pointless, i.e., whether taken or not, it always goes to instruction 302 immediately following it. Instruction 301 may be inserted by a compiler or a software developer. It is a form of instruction sometimes called a "pseudo-nop" (although in x86 even the canonical "nop" is actually the pseudo-nop "xchg ax, ax") in that it is a real instruction, but with these specific arguments it has no effect. This is clearly useful for forwards and backwards compatibility—the code functions correctly, and future architectures that choose not to implement the functionality can ignore them without breaking code.

Unlike the branch_hint instruction, it does not have a direct reference to the branch it is intended to be a hint for. Embodiments of the invention are to utilize the way modern predictors based on global branch history (such as gshare or bgG) to find correlations. In one embodiment, a branch predictor is to record the direction the last N branches took, construct a bit-string from that, and then use that bit-string to look up in a table of 2-bit saturating counter predictor (e.g., strongly taken, weakly taken, weakly not-taken, weakly not-taken). This provides good results when two branches at different locations have high correlation—the predictor can use the knowledge of where the first went to predict where the second went. As can be seen in FIG. 3A, a programmer or compiler has deliberately provided two branches 301 and 101 that are correlated. This means that there have already been all the mechanisms needed to use this trick to correctly hint the branch at the end of the loop, i.e., it is just the existing branch predictor doing what it does.

Figure 3B:
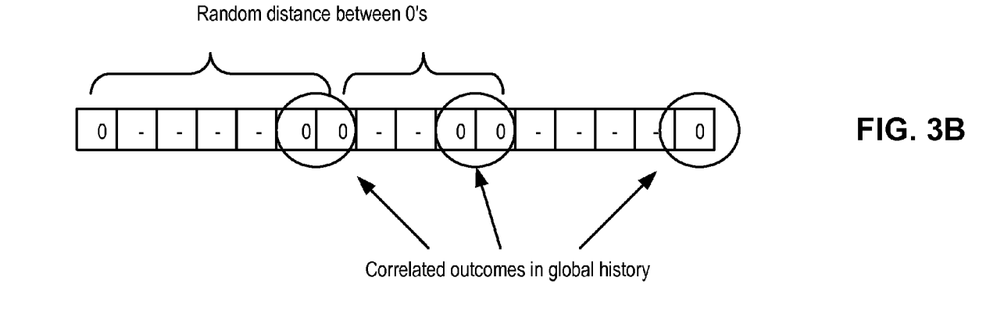

FIG. 3B illustrates an example global history for code as shown in FIG. 3B. It can be seen that every loop exit branch is preceded in global history in the immediate vicinity with an outcome that has a correlated value from branch 301. So no further changes are needed to predict second branch 101 correctly. That is, a typical branch predictor already does that. However, branch 301 does not have any correlated information in the global history when it comes to predicting its value, and will mispredict. Thus the misprediction has not been removed, but it has been moved from branch 101 to branch 301. Without further modification, this will still cause a performance penalty, as branch 301 will cause pipeline flushes.

According to one embodiment, an IP match logic as described above is utilized to solve this problem so that when branch 301 mispredicts it does not incur a misprediction performance penalty. The key observation is that whether branch 301 is taken or not, the instruction executed after it is always the same irrespective of its prediction outcome. Therefore, there is no possibility of wrong path instructions during misprediction of branch 301, and thus no pipeline flush is needed.

According to one embodiment, a general way to implement the necessary logic modification to the pipeline is to flush the pipeline based on checking when the actual IP calculated for the instruction that follows the branch is not equal to the predicted target instead of flushing the pipeline based on comparison of taken/not taken branch direction (misprediction detection), for example, by IP match logic 208 of FIG. 2. In other words, when the branch is finally non-speculatively executed, calculate the IP of the next instruction to be executed, and check that IP against the next instruction IP that was predicted by the branch predictor. If they match, the pipeline has fetched and/or speculatively executed the correct instruction sequence, and there is no need to flush the pipeline. This is true even if the taken/not-taken branch direction prediction was incorrect, i.e., something that would normally result in a misprediction and a pipeline flush.

However, some architectures only update the branch predictor internal state upon detecting a misprediction and they assume that misprediction always results in a pipeline flush. Thus, if there is no pipeline flush, the predictor state is never updated. This behavior needs to be modified to separate misprediction detection logic based on taken/not taken direction from pipeline flush logic based on IP comparison, and use the misprediction signal rather than the pipeline flush signal for updating the predictor. This is because in the above code when we have mispredictions for branch 301, it is important that the branch predictor gets this updated information about its actual outcome, even though with the new IP-checking, that instruction will never cause a pipeline flush. An alternative implementation is to keep the "misprediction=pipeline flush" assumption, and change the misprediction detection logic to be based on IP comparison, but always update the predictor with actual outcome for a branch-to-nowhere. A branch-to-nowhere can be detected in hardware once the taken and not-taken target addresses are available. The branch-to-nowhere has to be resolved and the global history updated with its actual outcome before the branch-under-prediction uses the global history for prediction lookup. This requirement imposes a minimum distance constraint between the branch-to-nowhere and the branch-under-prediction.

Figure 4:
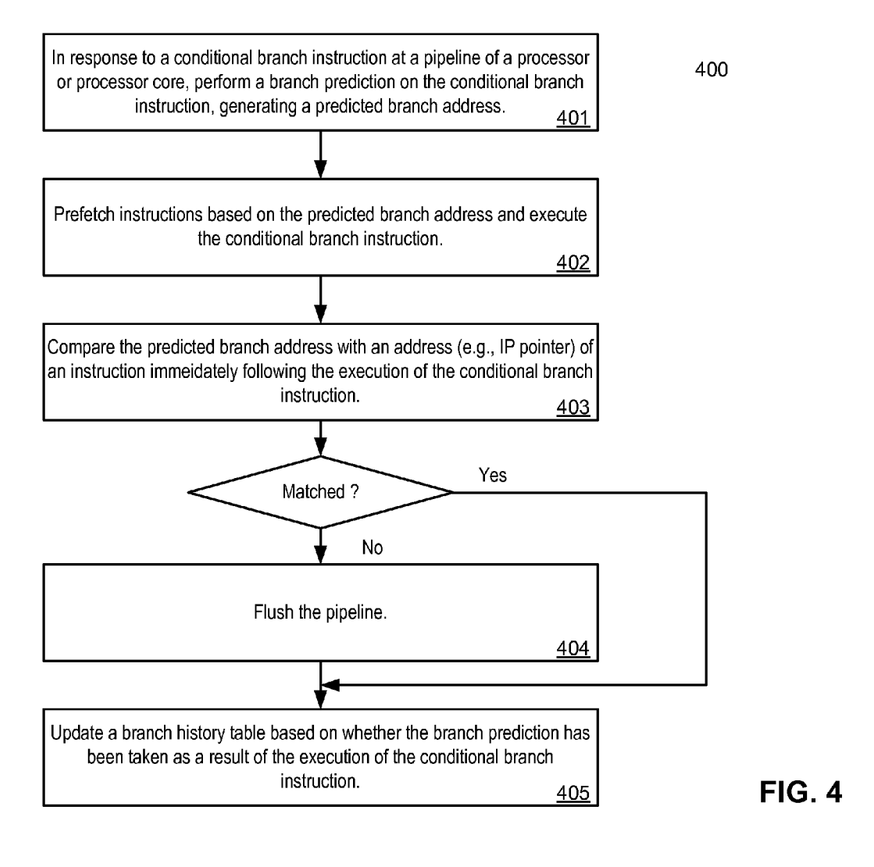
FIG. 4 is a flow diagram illustrating a method for branch predictions according to one embodiment of the invention.

FIG. 4 is a flow diagram illustrating a method for branch predictions according to one embodiment of the invention. Method 400 may be performed by processor 200 of FIG. 2. Referring to FIG. 4, at block 401, in response to a conditional branch instruction received at a pipeline of a processor or processor core, processing logic performs a branch prediction, generating a predicted branch address. At block 402, processing logic fetches one or more instructions based on the predicted branch address and the conditional branch instruction is executed by an execution unit. At block 403, processing logic compares the predicted branch address and an address of an instruction immediately following the conditional branch instruction. If they do not match (i.e., misprediction), at block 404, the pipeline is flushed. At block 405, the branch history table is updated based on whether the predicted branch has been taken or not taken.

Figure 5A:
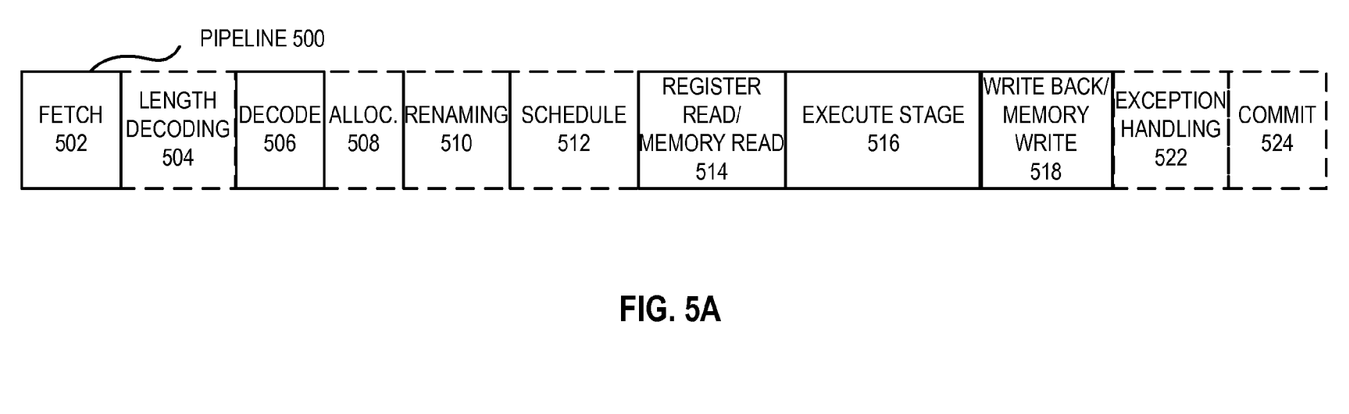
FIGS. 5A and 5B are block diagrams illustrating an execution pipeline of a processor according to certain embodiments.
Figure 5B:
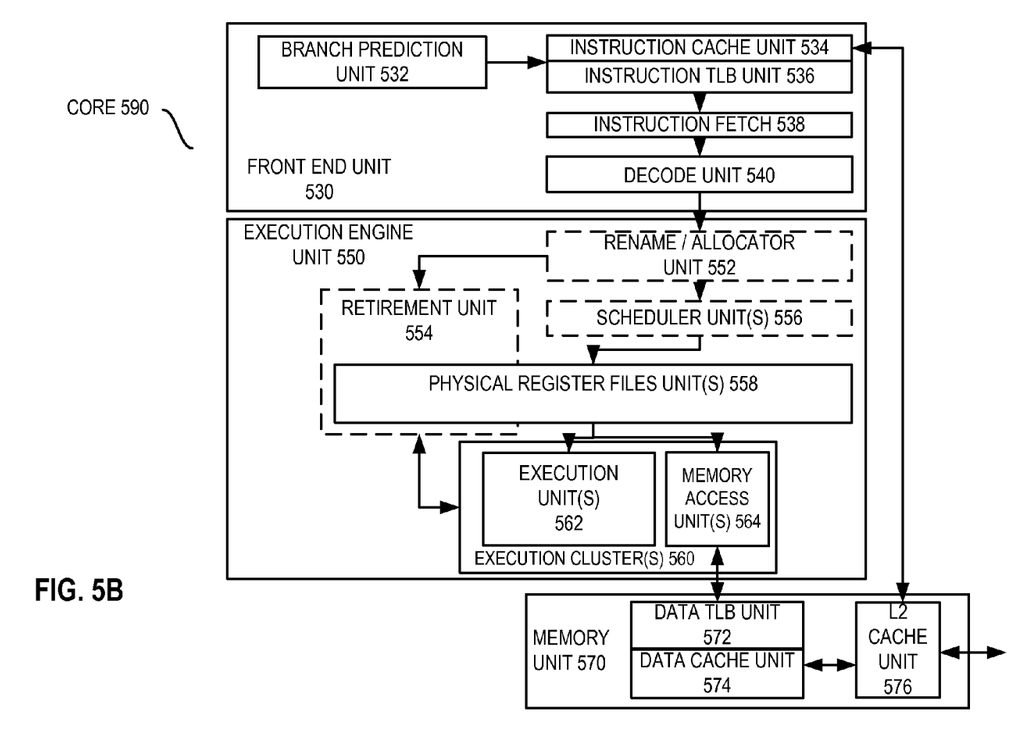

FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. FIG. 5A and/or FIG. 5B may be implemented as part of processor 200 of FIG. 2.

Referring to FIGS. 5A and 5B, the solid lined boxes illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation look-aside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
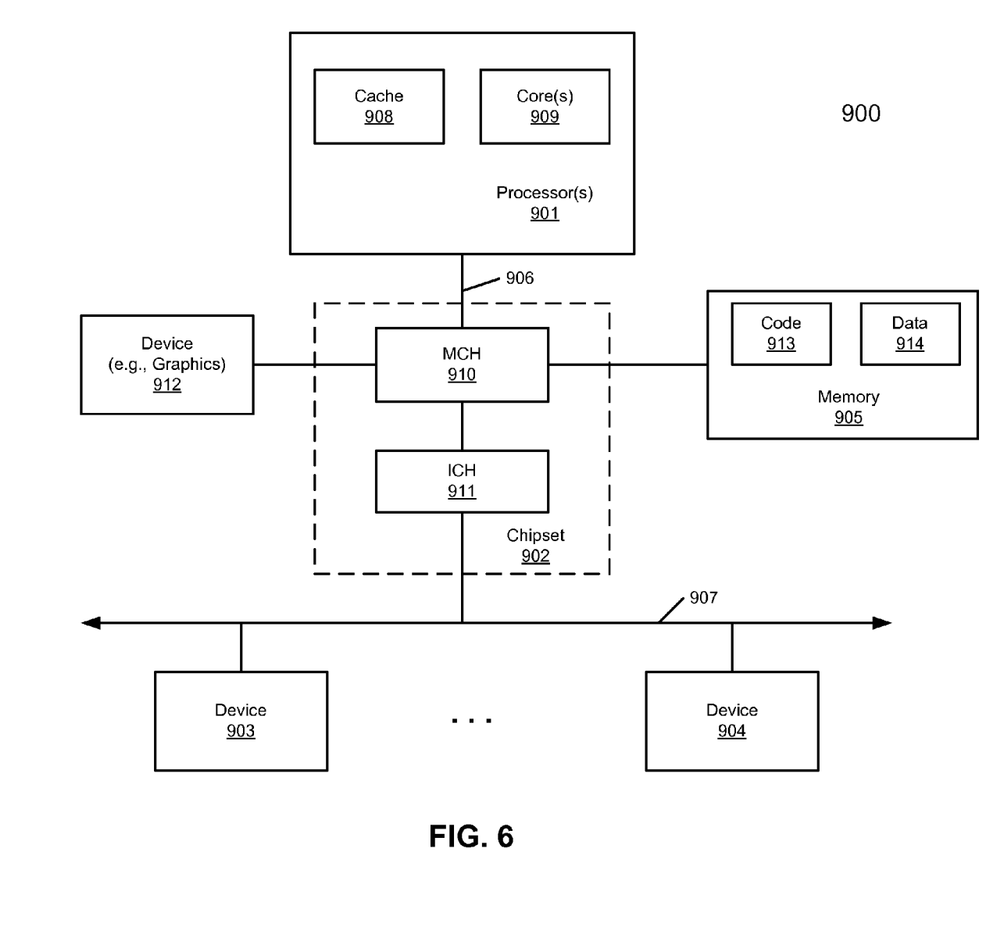
FIG. 6 is a block diagram illustrating an example of a data processing system according to one embodiment.

FIG. 6 is a block diagram illustrating an example of a data processing system according to one embodiment of the invention. System 900 may represent any of the systems described above. For example, system 900 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 6, in one embodiment, system 900 includes processor 901 and chipset 902 to couple various components to processor 901 including memory 905 and devices 903-904 via a bus or an interconnect. Processor 901 may represent a single processor or multiple processors with a single processor core or multiple processor cores 909 included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. For example, processor 901 may be a Pentium® 4, Pentium® Dual-Core, Core™ 2 Duo and Quad, Xeon™, Itanium™, XScale™, Core™ i7, Core™ i5, Celeron®, or StrongARM™ microprocessor available from Intel Corporation of Santa Clara, Calif. Processor 901 is configured to execute instructions for performing the operations and steps discussed herein.

Processor 901 may include an instruction decoder, which may receive and decode a variety of instructions. The decoder may generate and output one or more micro-operations, micro-code entry points, microinstructions, other instructions, or other control signals, which reflect, or are derived from, an original input instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder may not be a required component of processor 901. In one or more other embodiments, processor 901 may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the bit range isolation instruction, emulate, translate, morph, interpret, or otherwise convert the bit range isolation instruction, and output one or more instructions or control signals corresponding to the original bit range isolation instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic. Processor 901 and/or cores 909 may further include one or more execution units coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact or communicate with each other (e.g., through an intervening component). As one example, the decoder and the execution unit may be coupled with one another through an intervening optional buffer or other component(s) known in the arts to possibly be coupled between a decoder and an execution unit. Processor 901 and/or cores 909 may further include multiple different types of execution units, such as, for example, arithmetic units, arithmetic logic units (ALUs), integer units, etc. Processor 901 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Processor 901 and/or cores 909 may also optionally include one or more other well-known components. For example, processor 901 may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope is not limited to any known such combination or configuration. Embodiments may be implemented either with or without such additional components.

Chipset 902 may include memory control hub (MCH) 910 and input output control hub (ICH) 911. MCH 910 may include a memory controller (not shown) that communicates with a memory 905. MCH 910 may also include a graphics interface that communicates with graphics device 912. In one embodiment of the invention, the graphics interface may communicate with graphics device 912 via an accelerated graphics port (AGP), a peripheral component interconnect (PCI) express bus, or other types of interconnects. ICH 911 may provide an interface to I/O devices such as devices 903-904. Any of devices 903-904 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or a combination thereof.

Figure 7:
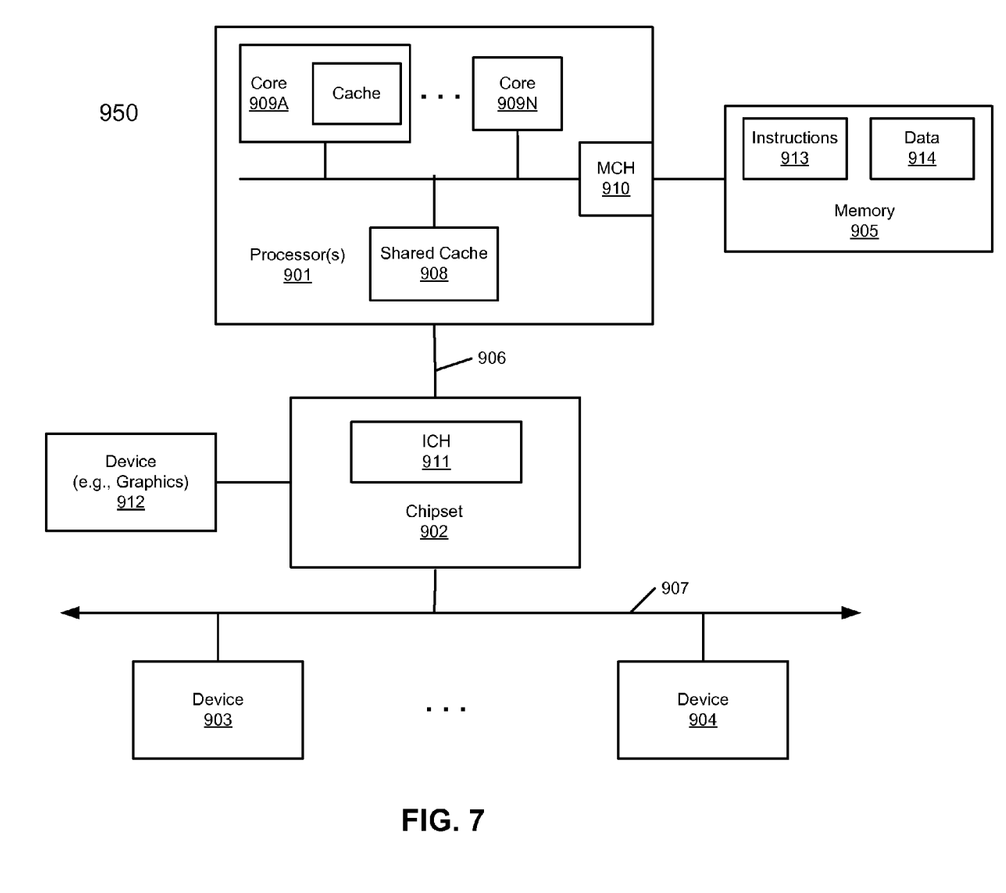
FIG. 7 is a block diagram illustrating an example of a data processing system according to another embodiment.

MCH 910 is sometimes referred to as a Northbridge and ICH 911 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 910 may be integrated with processor 901. In such a configuration, chipset 902 operates as an interface chip performing some functions of MCH 910 and ICH 911, as shown in FIG. 7. Furthermore, graphics accelerator 912 may be integrated within MCH 910 or processor 901.

Memory 905 may store data including sequences of instructions that are executed by processor 901, or any other device. For example, executable code 913 and/or data 914 of a variety of operating systems, device drivers, firmware (e.g., input output basic system or BIOS), and/or applications can be loaded in memory 905 and executed by processor 901. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 905 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 906 may be a multi-drop or point-to-point interconnect. The term FSB is intended to cover various types of interconnects to processor 901. Chipset 902 may communicate with other devices such as devices 903-904 via point-to-point interfaces. Bus 906 may be implemented as a variety of buses or interconnects, such as, for example, a quick path interconnect (QPI), a hyper transport interconnect, or a bus compatible with advanced microcontroller bus architecture (AMBA) such as an AMBA high-performance bus (AHB).

Cache 908 may be any kind of processor cache, such as level-1 (L1) cache, L2 cache, L3 cache, L4 cache, last-level cache (LLC), or a combination thereof. Cache 908 may be shared with processor cores 909 of processor 901. Cache 908 may be embedded within processor 901 and/or external to processor 901. Cache 908 may be shared amongst cores 909. Alternatively, at least one of cores 909 further includes its own local cache embedded therein. At least one of cores 909 may utilize both the local cache and the cache shared with another one of cores 909. Processor 901 may further include a direct cache access (DCA) logic to enable other devices such as devices 903-904 to directly access cache 908. Processor 901 and/or chipset 902 may further include an interrupt controller, such as an advanced programmable interrupt controller (APIC), to handle interrupts such as message signaled interrupts.

Embodiments of the invention include a processor having an execution pipeline having one or more execution units to execute instructions and a branch prediction unit coupled to the execution units. The branch prediction unit includes a branch history table to store prior branch outcomes, a branch predictor, in response to a conditional branch instruction, to predict a branch target address of the conditional branch instruction based on the branch history table, and address match logic to compare the predicted branch target address with an address of a next instruction executed immediately following the conditional branch instruction and to cause the execution pipeline to be flushed if the predicted branch target address does not match the address of the next instruction to be executed. The branch predictor is further to examine whether the branch is taken or not, once it has been resolved and executed, and update the branch history table based on whether the branch has been taken. The conditional branch instruction is a first conditional branch instruction, and wherein the updated branch history table is used to predict a second conditional branch condition that correlates with the first conditional branch instruction. The first conditional branch instruction is to branch to an address immediately following an address of the first conditional branch instruction. The first conditional branch is inserted by a compiler to improve accuracy of branch prediction of the second conditional branch instruction. The first conditional branch instruction is placed before the second conditional branch instruction by at least a predetermined number of clock cycles that are determined based on a length of the execution pipeline. The address match logic is to compare an instruction pointer (IP) of the predicted branch target address to an IP of the address of the next instruction.

An example of a method performed by embodiments of the invention includes predicting a branch target address of a conditional branch instruction based on the branch history table storing prior branch predictions, the conditional branch instruction to be executed by an execution pipeline of a processor; comparing the predicted branch target address with a resolved branch target address; and flushing the execution pipeline if the predicted branch target address does not match the resolved branch target address. The method further includes examining whether the branch is taken or not, once it has been resolved and executed; and updating the branch history table based on whether the branch has been taken. The conditional branch instruction is a first conditional branch instruction, and wherein the updated branch history table is used to predict a second conditional branch condition that correlates with the first conditional branch instruction. The first conditional branch instruction is to branch to an address immediately following an address of the first conditional branch instruction. The first conditional branch is inserted by a compiler to improve accuracy of branch prediction of the second conditional branch instruction. The first conditional branch instruction is placed before the second conditional branch instruction by at least a predetermined number of clock cycles that are determined based on a length of the execution pipeline. The comparing the predicted branch target address with the address of the next executed instruction determines whether or not to flush a pipeline of speculatively fetched, decoded and executed instructions. Embodiments of the invention can further be performed by a data processing system, where the data processing system includes a dynamic random-access memory (DRAM); and a processor coupled to the DRAM configured to perform the method set forth above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   an execution pipeline having one or more execution units to execute instructions; and
   a branch prediction unit coupled to the execution units, the branch prediction unit including
      a branch history table to store prior branch outcomes,
      a branch predictor, in response to a conditional branch instruction, to predict a branch target address of the conditional branch instruction based on the branch history table, and
      address match logic to compare the predicted branch target address with an address of an instruction to be executed subsequent to the conditional branch instruction and to cause the execution pipeline to be flushed when the predicted branch target address does not match the actual branch target;
   wherein the conditional branch instruction comprises a branch-to-nowhere that always goes to a next instruction to a code stream.

2. The processor of claim 1, wherein the branch predictor is further to examine whether the branch is taken or not, once it has been resolved and executed, and update the branch history table based on whether the branch has been taken.

3. The processor of claim 2, wherein the conditional branch instruction is a first conditional branch instruction, and wherein the updated branch history table is used to predict a second conditional branch condition that correlates with the first conditional branch instruction.

4. The processor of claim 3, wherein the first conditional branch instruction is to branch to an address immediately following an address of the first conditional branch instruction.

5. The processor of claim 3, wherein the first conditional branch instruction is placed before the second conditional branch instruction by at least a predetermined number of clock cycles that are determined based on a length of the execution pipeline.

6. The processor of claim 1, wherein the address match logic is to compare an instruction pointer (IP) of the predicted branch target address to an IP of the address of the next instruction.

7. A computer implemented method, comprising:
   predicting a branch target address of a conditional branch instruction based on a branch history table storing prior branch predictions, the conditional branch instruction to be executed by an execution pipeline of a processor;
   comparing the predicted branch target address with a resolved branch target address of instruction to be executed subsequent to the conditional branch instruction; and
   flushing the execution pipeline if the predicted branch target address does not match the resolved branch target address;
   wherein the conditional branch instruction comprises a branch-to-nowhere that always goes to a next instruction in a code stream.

8. The method of claim 7, further comprising:
   examining whether the branch is taken or not, once it has been resolved and executed; and
   updating the branch history table based on whether the branch has been taken.

9. The method of claim 8, wherein the conditional branch instruction is a first conditional branch instruction, and wherein the updated branch history table is used to predict a second conditional branch condition that correlates with the first conditional branch instruction.

10. The method of claim 9, wherein the first conditional branch instruction is to branch to an address immediately following an address of the first conditional branch instruction.

11. The method of claim 9, wherein the first conditional branch is inserted by a compiler to improve accuracy of branch prediction of the second conditional branch instruction.

12. The method of claim 11, wherein the first conditional branch instruction is placed before the second conditional branch instruction by at least a predetermined number of clock cycles that are determined based on a length of the execution pipeline.

13. The method of claim 7, wherein comparing the predicted branch target address with the address of the next executed instruction determines whether or not to flush a pipeline of speculatively fetched, decoded and executed instructions.

14. A data processing system, comprising:
   a dynamic random-access memory (DRAM); and
   a processor coupled to the DRAM, the processor including an execution pipeline having one or more execution units to execution the instructions, and a branch prediction unit coupled to the execution units, the branch prediction unit including a branch history table to store prior branch predictions, a branch predictor, in response to a conditional branch instruction, to predict a branch target address of the conditional branch instruction based on the branch history table, and address match logic to compare the predicted branch target address with an address of a next instruction executed immediately following the conditional branch instruction and to cause the execution pipeline to be flushed if the predicted branch target address does not match the address
   wherein the conditional branch instruction comprises a branch-to-nowhere that always goes to a next instruction in a code stream.

15. The system of claim 14, wherein the branch predictor is further to examine whether the branch is taken or not, once it has been resolved and executed, and update the branch history table based on whether the branch has been taken.

16. The system of claim 15, wherein the conditional branch instruction is a first conditional branch instruction, and wherein the updated branch history table is used to predict a second conditional branch condition that correlates with the first conditional branch instruction.

17. The system of claim 16, wherein the first conditional branch instruction is to branch to an address immediately following an address of the first conditional branch instruction.

18. The system of claim 16, wherein the first conditional branch is inserted by a compiler to improve accuracy of branch prediction of the second conditional branch instruction.

19. The processor of claim 1, wherein the conditional branch instruction does not have a direct reference to a branch it is intended to be a hint for.

20. The processor of claim 1, wherein branch predictor is to record a direction for a last N branches, to construct a bit-string, and use the bit-string to look up in a table of 2-bit saturating counter predictor.

\* \* \* \* \*